United States Patent [19]
Sorkin

[11] 3,786,409
[45] Jan. 15, 1974

[54] SWEEP SIGNAL SEISMIC EXPLORATION

[75] Inventor: Sam A. Sorkin, Houston, Tex.

[73] Assignee: Teledyne Exploration Company, Houston, Tex.

[22] Filed: Aug. 7, 1972

[21] Appl. No.: 278,297

[52] U.S. Cl. 340/15.5 CC, 340/15.5 SC, 340/15.5 CP
[51] Int. Cl. .......................... G01v 1/14, G01v 1/22
[58] Field of Search ............. 340/15.5 CC, 15.5 CP, 340/15.5 SC

[56] References Cited
UNITED STATES PATENTS
3,523,277  8/1970  Landrum..................... 340/15.5 CC
3,386,525  6/1968  Landrum et al............. 340/15.5 CC

OTHER PUBLICATIONS

Melton et al. "Polarity Coincidence Scheme for Revealing Signal Coherence," 7/57, Geophysics; Vol. 22, No. 3, pp. 553–564.
Kim et al. "The Effect of Harmonic Distortion of Vibroseis Signals," 39th Annual Meeting of SRP, PPR Publication No. 553.

Primary Examiner—Maynard R. Wilbur
Assistant Examiner—N. Moskowitz

[57] ABSTRACT

A series of sweep signals is generated at one or more locations and transmitted into the earth. The reflected signals from subsurface earth formations are composited and a correlogram produced by cross-correlation with the transmitted signal. To reduce the correlogram tail produced by harmonic distortion in the received signals, a series of sweeps, preferably even numbered, is recorded, alternate sweeps being recorded in the normal manner and the other sweeps being recorded using reversed polarity of the sweeps and reversed polarity of the seismometer input to the seismic amplifier, while maintaining the same signal amplitude during all sweeps, and then compositing and cross-correlating in the usual manner.

13 Claims, 6 Drawing Figures

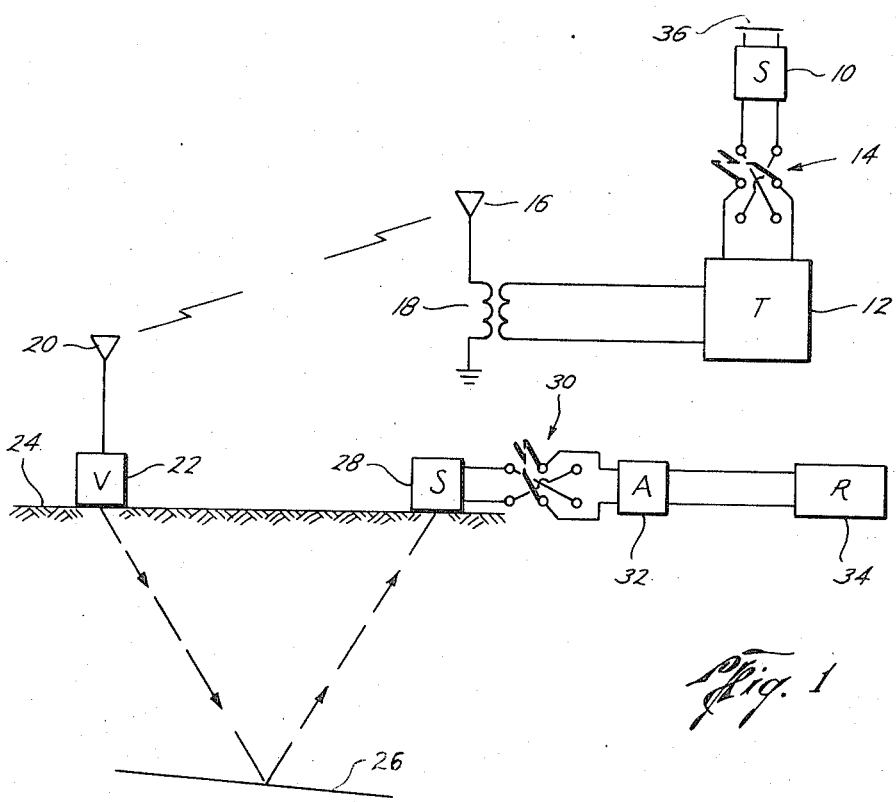
Fig. 1
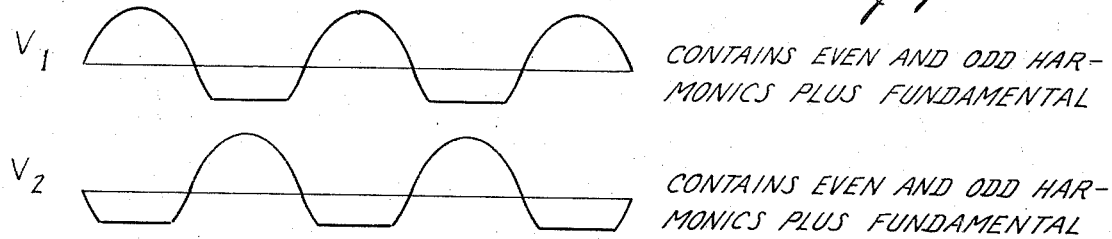
Fig. 2(a)
CONTAINS EVEN AND ODD HARMONICS PLUS FUNDAMENTAL
CONTAINS EVEN AND ODD HARMONICS PLUS FUNDAMENTAL
Fig. 2(b)
Fig. 3
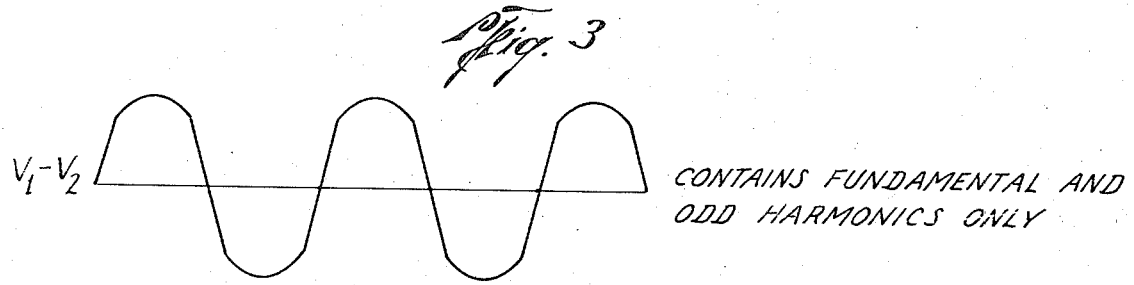
CONTAINS FUNDAMENTAL AND ODD HARMONICS ONLY

SWEEP SIGNAL SEISMIC EXPLORATION

BACKGROUND OF THE INVENTION a. Field of the Invention

This invention pertains to seismic exploration and more particularly to such exploration using sweep signals, compositing, and cross-correlation, as in the method known to the trade as "Vibroseis."

b. Background of the Invention

It is known to generate a seismic signal at one position on the earth's surface and receive and record it as a function of time at another position on the earth's surface to determine the depth of reflecting formations beneath the earth's surface. It is also known to use a plurality of receivers spread out in various patterns whose outputs are summed to produce a composite received signal in which the signal amplitude is enhanced relative to the noise, and to repeat the signal at the same or a number of adjacent locations and to composite the received signals. A variety of signal generators have been used for the purpose including primarily dynamite explosions and more recently a variety of devices for producing fluid explosions and mechanical vibrations or impacts.

The Vibroseis type of mechanical vibrator signal generator produces an alternating signal of relatively long duration, e.g., of the same order of magnitude as the travel time from transmitter to receiver, and continuously varying in frequency, such signal being herein termed a sweep signal. An upsweep is a signal of gradually increasing frequency, and a downsweep is a signal of gradually decreasing frequency. Sweep signals are so distinctive that even low amplitude sweep signals can be selected from the random noise at the receiver by using the cross-correlation or pulse compression method. This enables a low amplitude mechanical vibrator to be used as a seismic generator.

In the cross-correlation method each increment of the received signal is multiplied by a corresponding increment of the transmitted signal and the products summed over a selected period of time or window. The process is repeated with the received signals shifted in time relative to the transmitted signal. The process is further repeated with different time shifts. The summations are plotted against the time shifts producing a cross-correlation curve or correlogram. The time shift corresponding to the maximum summation is taken as the travel time between generation and reception of the sweep signal.

The sweep signal method of seismic exploration and various improvements thereon are described in U.S. Pat. Nos. 2688124, 2808577, 2874795, 2981928, 2989726, and 3209322, the disclosures of which are herein incorporated by reference. The general principles of correlation are set forth in a paper entitled "Correlation Techniques - A review" by N. A. Ansley, Information Bulletin D-16, published by Seismograph Service Corporation, Tulsa, Oklahoma; the disclosure of which is also incorporated herein by reference. This paper is reproduced in Volume 12, No. 4, of Geophysical Prospecting at Pages 355-382 (1964). Various methods and apparatus useful in connection with the sweep signal seismic exploration method are set forth in U. S. Pat. Nos. 2750575, 2910134, 3065433, 3127508, 3152658, and 3208545, the disclosures of which are herein incorporated by reference.

In the above described sweep signal method of seismic exploration, the signal generator includes a base plate in which mechanical vibrations are induced, e.g., by electro hydraulic or electromechanical means, such base plate being positioned in contact with or mechanically coupled to the earth's surface to transmit mechanical vibratory signals into the earth. Such apparatus is described in U.S. Pat. Nos. 3024861 and 3282372 and in other patents hereinabove mentioned, the disclosures thereof being herein incorporated by reference.

In a paper that was presented at the 39th Annual Meeting of the Society of Exploration Geophysicists in Calgary, Canada, entitled "The Effect of Harmonic Distortion of Vibroseis Signals" by Kim and Seriff, EPR Publication No. 553, the disclosure of which is incorporated herein by reference, it is indicated that such distortion may arise from non-linear processes, especially in the coupling of the vibrator to the ground. It is stated that the effect of harmonic distortion of the outgoing Vibroseis signal is to produce a long osciallatory tail to the correlogram of a downsweep, and a forerunner in the case of an upsweep. It is further stated that "the significant part of the cross correlation amplitude occurs in a time interval $T_1$ to $T_2$, or $-T_1$ to $-T_2$ **** where $T_1$ is the shift of the fundamental relative to the harmonic which brings the instantaneous frequency $kf_o$ into coincidence in the two signals and $T_2$ is the shift that brings the frequency $f_n$ in the fundamental opposite the same frequency in the harmonic. * * * It can be shown that $T_1$ and $T_2$ are given by $T_1 = [(k-1) T f_o/W]$ and $T_2 = [(k-1) T f_m/kW]$"

In the foregoing

W is the frequency range of the fundamental sweep k is the number of the harmonic $f_o$ is the lowest instantaneous frequency $f_m$ is the highest instantaneous frequency.

Since the distortion appears as a forerunner in the case of an upsweep, there is no problem of the distortion effect masking the received signals. In the case of a downsweep, which may be preferable to an upsweep because of reasons associated with the synchronization of multiple vibrators and maintenance of fixed phase between the reference driving signal and the base plate motion, the distoriton tail can be delayed by increasing the time of the sweep so that there will be no interference with early received signals, but late arrivals may be masked unless a very long sweep is used, and such long sweeps may be undesirable for other reasons.

It is an object of the present invention to minimize the distortion tail on the correlograms of downsweeps whereby down sweeps can be used without difficulty and without need for excessively long sweep times.

SUMMARY OF THE INVENTION

In the VIBROSEIS method of seismic exploration the effects of base plate distortion can be serious, especially when using a down sweep. Any harmonic frequencies present in the signal being cross-correlated with the reference signal result in a band of sinusoidal oscillations. In the case of a linear frequency down sweep this band has maximum amplitude between the times $T_1 = [(K-1)T fo/W]$ and $T_2 = [(K-1)T fm/KW]$ where K = order of harmonic $W = f_{m-fo}$ T = length of sweep $f_o$ = lowest frequency of sweep
$f_m$ = highest frequency of sweep.

If K is restricted to odd integers, the minimum time for $T_1$ is $2T f_o/W$, for the 3rd harmonic, which is twice the time for the 2nd harmonic, and for $T_2$ is $2 T f_m/3W$, which is 4/3 the time for the 2nd harmonic. The ratio $T_2/T_1$ is $f_m/3 f_o$; hence, $f_m$ must be greater than $3 f_o$ for the 3rd harmonic to cause interference.

Therefore, if the 2nd harmonic distortion can be eliminated, down sweeps can be used for sections twice the time depth possible with this distortion present.

In accordance with the invention second and even higher even order harmonic distortion in the composite signal record produced by summation of the records of the received signals from a series of sweep signals transmitted from a sweep signal seismic generator is substantially reduced by recording in the normal manner every other sweep of a series of sweeps and recording the remainder of the sweeps using reversed polarity of the sweeps and reversed polarity of the seismometer inputs to the seismic amplifier while maintaining the same signal amplitude during all sweeps and preferably making an even number of sweeps, and then summing the recorded sweeps in the usual manner prior to cross-correlating same with the transmitted signal.

BRIEF DESCRIPTION OF THE DRAWINGS

FIG. 1 is a schematic diagram of apparatus for seismic exploration in accordance with the invention;

FIGS. 2 (a) and 2 (b) are hypothetical graphs of vibrator base plate motion versus time for motions starting with positive and negative half cycles, respectively;

FIG. 3 is a graph showing the result of subtracting the graph of FIG. 2(b) from the graph of FIG. 2(a);

DESCRIPTION OF THE PREFERRED EMBODIMENT

Figure 4:
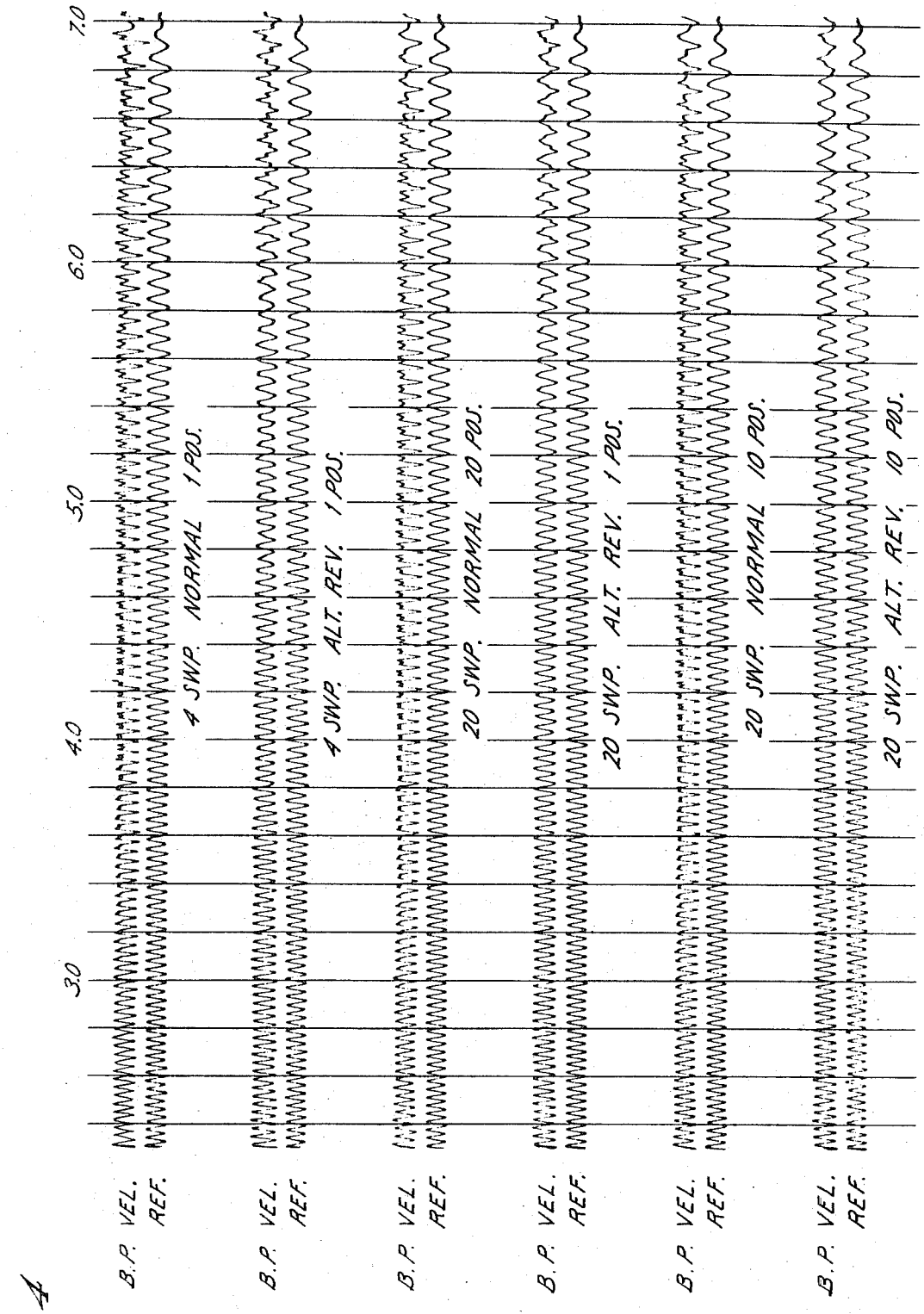
FIG. 4 is a series of pairs of traces comparing excitation and base plate signals of a sweep signal generator under various conditions.

Referring now to FIG. 1 there is shown a means, e.g., a tape player 10 for generating sweep signals to control a radio transmitter 12. The signal generator 10 is connected to the transmitter 12 through reversing switch 14. Transmitter 12 is connected to antenna 16 through transformer 18. Radio signals from antenna 16 are received by antenna 20 and control the activity of seismic vibrator 22 which is coupled to the surface 24 of the earth. Seismic vibrations from vibrator 22 are reflected from subsurface formation 26 and received by seismometer 28. The output of seismometer 28 is connected through reversing switch 30 to amplifier 32, and the latter is connected to recorder 34.

In operation, signal generator 10 is activated, e.g., by closing switch 36 to cause transmitter 12 to send out a sweep signal, e.g., a down sweep of 40 to 10 Hertz. This sweep signal is transmitted to vibrator 22 which in turn generates a sweep signal that is transmitted through the earth and reflected by formation 26 to seismometer 28. The received signal is recorded by recorder 34. The switches 14 and 30 are then reversed and the foregoing sequence is repeated, preferably with seismometer 28 and vibrator 22 in the same locations. The dual sequence just described may then be repeated any desired number of times as is felt necessary to minimize noise by compositing, e.g., ten dual sequences or 20 sweeps. Preferably after each dual sequence the vibrator (or seismometer) is moved in order in the known manner to reduce in the composite the amplitude of the first arrivals or direct transmissions from from vibrator to seismometer.

The records of the several sweeps produced by recorder 34 are then composited (summed) in the conventional manner. The second and even order harmonic distortion present in the individual records will be reduced to the point of substantial elimination in the composite record. The composite record is then cross-correlated and due to the distortion reduction in the composite, the tail in the correlogram is minimized.

If the recorder 34 is of the digital type, instead of reversing the polarity of the amplifier the recorder can be instructed to record complements of alternate sweeps, whereby addition of the sweeps will produce the desired subtraction. Or the computer used to composite the sweeps can be instructed to add only alternate sweeps and subtract the others.

Although in the foregoing description only one seismometer has been described the method is equally applicable to the usual arrays of seismometers. Although it is preferred to record two sweeps with normal and double reversed polarity (both sweep transmitter and sweep recorder reversed) while the vibrator is at a single location followed by recordings of two sweeps each with the vibrator at a plurality of adjacent locations, benefit will be had by the alternate normal and double reversed recording method even if all seismometer records are made with the vibrator at one location or if every record is made with the vibrator at a different location. It is also to be observed that moving the seismometer or seismometer array would be equivalent to moving the vibrator but more difficult in procedure.

A better appreciation of the scope of the method and the reason for its effectiveness may be had from applicant's paper entitled "A Method For Reducing The Effects of 'Vibroseis' Base Plate Distortion", a restricted distribution of which has been made by Teledyne Exploration Company since October 1971, the disclosure of which is herein incorporated by reference. The following is abstracted from that paper.

The non-linearity of the earth and/or the combined hydraulic-electro-mechanical drive system of a hydraulic vibrator excited by a sinusoidal signal causes the generation of harmonics of the exciting frequency.

The motion of the base plate of a vibrator may be non-symmetrical because of differences between the reaction of the ground against the base plate when moving up from its rest position and when moving down from its rest position (i.e., the ground acts as a non-linear spring) and/or because of unequal reactions in the vibrator mechanical-hydraulic mechanism or in the electro-mechanical servo-system. Whatever the cause of the non-linearity the Fourier analysis components of motion include odd and even harmonics. Symmetrical motion includes only odd harmonics and fundamental frequencies. Even if the excitation of the vibrator is sinusoidal, the motion of the base plate for the positive excursion from rest position will be different than that for the negative excursion. Now, if the motion starts with a positive half cycle in one instance as shown in FIG. 2(a), and starts with a negative half cycle in the next instance, as shown in FIG. 2 (b), then comparing the two instances, alternate half cycles will have the same motion.

Now if $V_2$ is subtracted from $V_1$, (note that this is equivalent to inverting $V_2$ and adding to $V_1$), both halves of the cycle will have the same shape and be symmetrical about the zero line, as shown in FIG. 3. This can be demonstrated mathematically, as follows:

The velocity of the earth surface can be expressed as a power series of the excitation. If the excitation = $A \sin 2\pi ft$ then $V_1 = a (\sin 2\pi ft) + b (\sin 2\pi ft)^2 + c (\sin 2\pi ft)^3 + d (\sin 2\pi ft)^4 + ---$ $= a \sin 2\pi ft + b \sin^2 2\pi ft + c \sin^3 2\pi ft + d \sin^4 2\pi ft + ---$ $= a \sin 2\pi ft + (b/2) (1 - \cos 2 \cdot 2\pi ft) + c(\tfrac{3}{4} \sin 2\pi ft - \tfrac{1}{4} \sin 3 \cdot 2\pi ft) + (d/4) (3/2 - \cos 2 \cdot 2\pi ft + \tfrac{1}{2} \cos 4 \cdot 2\pi ft) + ---$ even powers result in even harmonics, while odd powers result in odd harmonics.

If the excitation is reversed in polarity, i.e., $= -A \sin 2\pi ft$ then $V_2 = a(-\sin 2\pi ft) + b(-\sin 2\pi ft)^2 + c(-\sin 2\pi ft)^3 + d(-\sin 2\pi ft)^4 + ---$ $= -a \sin 2\pi ft + b \sin^2 2\pi ft - c \sin^3 2\pi ft + d \sin^4 2\pi ft + ---$ subtracting $V_2$ from $V_1$ $V_1 - V_2 = 2 a \sin 2\pi ft + 2 c \sin^3 2\pi ft + ---$ $= 2 a \sin 2\pi ft + (3c/2) \sin 2\pi ft - c/2 \sin 3 \cdot 2\pi ft + ---$ $= (2a + 3c/2) \sin 2\pi ft - c/2 \sin 3 \cdot 2\pi ft + ---$ all even harmonics cancel, leaving only odd harmonics.

Reversing the polarity of the excitation and simultaneously reversing the polarity of $V_2$ permits addition instead of subtraction for the same cancellation of even harmonics.

Digressing for a moment, it will be apparent from the foregoing that the method of the invention can be performed not only by double reversal on alternate recordings as hereinbefore described but also by simple reversal of excitation for alternate sweep signals and subtraction of every second signal record from the preceding signal record, but this, of course, would make compositing of more than two records more complex unless the record is digitized and composited by a computer.

Returning to the explanation of the theory behind the present invention, in the case of swept frequency excitation, the two half cycles will not be exactly the same in time duration; therefore, the composite half cycles will not have exactly the same shape, and cancellation of the even harmonics will not be perfect. In addition, since it is usual to taper the amplitude at the start and finish of the sweep, the amplitude of the two halves of the sweep will not be the same during the taper periods, so cancellation will deteriorate at the ends of the sweep.

If (a) the vibrator remains at the same location on the ground and the ground characteristics do not change, cancellation can be expected to be good. If (b) the vibrator moves to a different location each time and the ground characteristics change materially, cancellation will not be as good but some cancellation will still take place. If (c) the vibrator remains at each location for two sweeps before moving to the next location, cancellation will be at least as good as if all sweeps were performed at the same location.

Since the amplitude of the distortion correlation oscillations is dependent on the amplitude of the fundamental, any procedure which reduces the direct arrivals (i.e., first breaks) will also reduce the amplitude of the correlation oscillations. Therefore, "(c)" will usually result in lower distortion oscillations than "(a)".

In FIG. 4 the top two traces show the excitation and base plate velocity signals of a vibrator driven by a 40-10 Hz sweep. The top trace is the velocity signal with AGC applied. It is obtained by integrating the base plate accelerometer and applying automatic gain control. The second trace is the excitation signal. These traces are the resultant after summing four sweeps with the vibrator remaining in one position on the ground.

The second pair of traces show the resultant with the same conditions as in the first two traces, except that the polarity of the vibrator excitation signal, and simultaneously the polarity of the signals to the amplifiers of both traces, were reversed on alternate sweeps. Note that practically all distortion is eliminated until reaching the low frequency end of the sweep and that when distortion is present it is symmetrical, thus containing odd harmonic distortion only. The third pair of traces are the resultant of summing 20 sweeps in 20 locations spread over a distance of approximately 300 feet. The fourth pair of traces are also the resultant of summing 20 sweeps as before, except that the excitation polarity and amplifier input polarities were reversed at alternate locations. The fifth pair of traces are the result of summing 20 sweeps in 10 locations spread over approximately 300 feet, while the sixth pair of traces are the result of summing 20 sweeps at the same ten locations except that the vibrator excitation and polarity and signal input polarities were reversed for the second sweep at each location. Note that while the distortion evident on the base plate velocity signal is approximately the same for 20 sweeps at both 20 and 10 locations when the distortion cancellation method is not used, the cancellation is better for 10 locations when the cancellation method is used. This, of course, is due to vibrating against ground with almost the same reaction characteristics for two sweeps of opposite direction of motion, thus permitting better cancellation of distortion than when each sweep is vibrated against a different reaction characteristic.

Fourier analyses of the excitation and base plate velocity signals for a 500 ms portion of the sweep show the effective cancellation of distortion when using the polarity reversal method.

Figure 5:
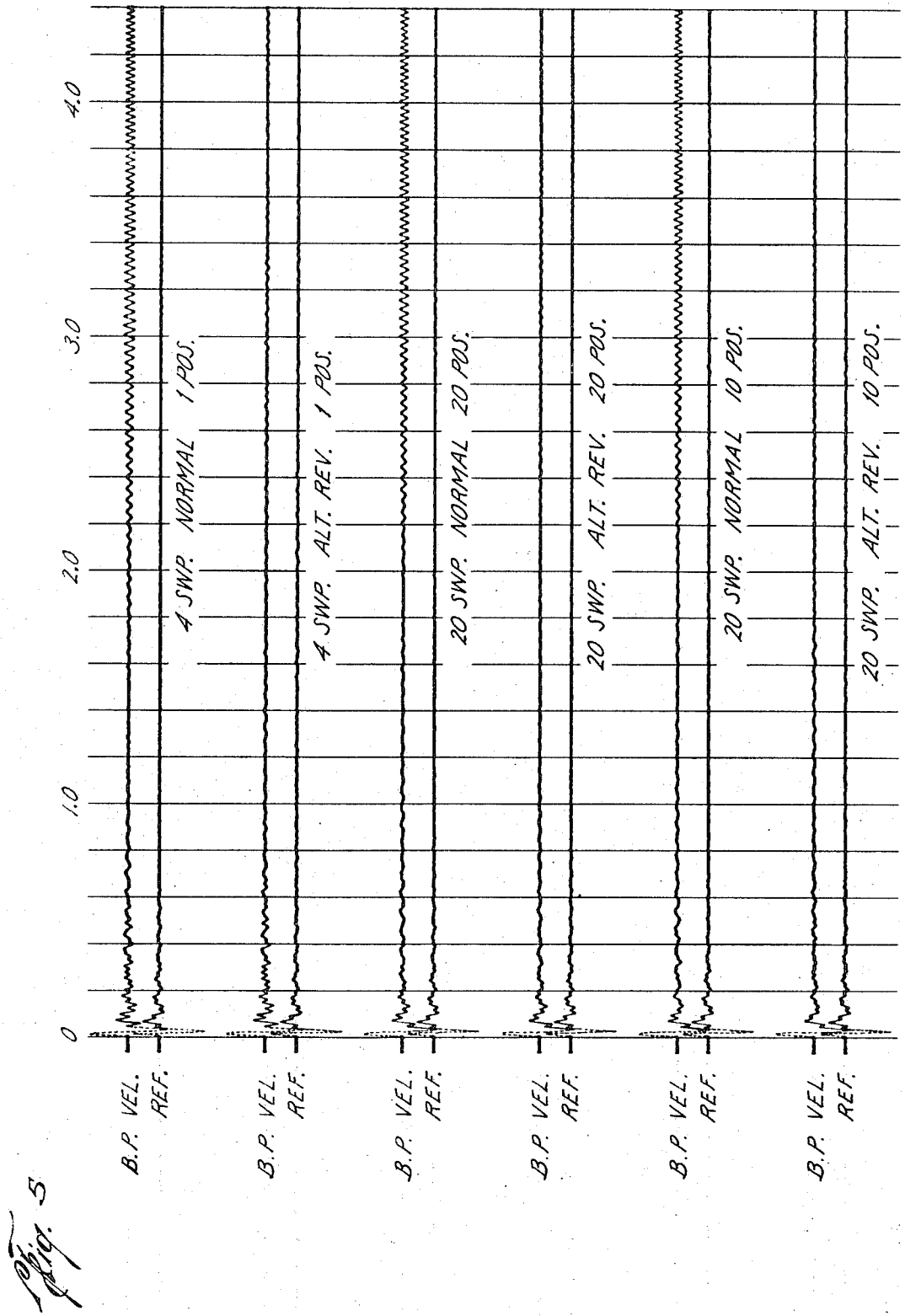
FIG. 5 shows the auto and cross-correlations of the same signals shown in FIG. 3.

FIG. 5 shows the auto- and cross-correlations of the same signals shown in FIG. 3. Note that the reference traces of all pairs have no oscillations later than 1 second, while the accelerometer traces of the top, third and fifth pairs of traces have a band of oscillations starting with a frequency of 20 Hz at about 2.1 seconds and increasing to nearly 40 Hz at 4.4 seconds where the correlations were terminated. The accelerometer traces of the second, fourth and sixth pairs do not show these oscillations, thus confirming the effectiveness of cancelling the second harmonic distortion by reversing the sweep polarity on alternate sweeps while simultaneously reversing the input to the amplifiers.

Although FIGS. 4 and 5 show only single traces, in actual practice a plurality of seismometers would be used receiving signals from a plurality of vibrators. For example there might be employed a split spread of 24 groups of seismometers receiving signals from 20 seven second sweeps of 40 – 10 Hz using 4 vibrators grouped at 10 different locations.

By way of conclusion it can be stated that in the "Vibroseis" method of seismic exploration when using a swept sinusoidal reference signal to control the vibrator base plate motion, the use of down sweeps can be detrimental to the data. The presence of harmonic distortion in the base plate velocity causes distortion signals after a time interval which is determined by the time duration and end frequencies of the sweep. While the interference of these distortion products can be moved to a time later than the latest record time of interest by increasing the time duration of the sweep, a method of minimizing the effects of harmonic distortion other than this method is desirable.

One method resulting in substantial elimination of even order harmonic distortion is as follows:

a. Record the odd (or even) numbered sweeps of a series in the normal manner using the normal sweep.

b. Record the even (or odd) numbered sweeps of a series using reversed polarity of the sweep while maintaining the same amplitude as in "a" and reversing the polarity of the seismometer inputs to the seismic amplifiers.

c. Preferably, but not necessarily restrict the number of sweeps in a series to an even number.

d. Sum the recorded sweeps in the normal manner.

Any known recording means 34 can be used, magnetic, digital, optical, or mechanical, and any known means can be used for compositing and cross-correlating the records. Conventional means such as disclosed in U. S. Pat. No. 3,209,322, will be used to insure that each sweep signal from generator 10 starts in predetermined time phase. For example, the generator 10 may include a repeating magnetic tape and a tape player. Instead of transmitting the sweep signal from transmitter 12, the desired repeating signals of alternating phase can be generated by suitable means, e.g., digital or analog sweep generator, at vibrator 22, and the transmitter 12 can merely send out a starting pulse.

It should be mentioned that if a reasonably large number of sweeps is used, e.g., nine sweeps or more, it is not necessary to use an even number of sweeps to effect substantial reduction of the even order harmonic distortion. Also, the sweeps using reversed polarity need not alternate with those of normal polarity but can instead occur all together or at random or at any time and be of any number compared to the total number of sweeps, the invention being achieved at least in part by compositing the records of the signals in such a manner that the signals of reversed polarity are subtracted from those of normal polarity.

Although the invention will find great utility in connection with sweep signals, other forms of coded signals could be employed, e.g., a signal composed of a single frequency lasting for a certain length of time followed by a different frequency for a period of time, followed by still another frequency for a further period of time. The only necessary characteristic of the signal is that it be of varying frequency and last for several cycles.

Although the invention is primarily intended for use in seismic exploration using the reflection method, it is also applicable to refraction metnods.

While a preferred embodiment of the invention and various modifications thereof have been described, other modifications thereof can be made by one skilled in the art without departing from the spirit of the invention.

I claim:

1. Method of seismic exploration comprising:
generating a signal of frequency changing with time,
supplying said signal to a transducer whose mechanical output is positioned to transmit a mechanical vibratory signal to the earth in response to receipt of said signal by said transducer,
receiving said mechanical vibratory signal transmitted through the earth,
recording the received mechanical vibratory signal,
repeating the foregoing steps once with reversed polarity of said generated signal,
subtracting one received record from the other to produce a composite record, and
cross-correlating said composite record.

2. Method according to claim 1 wherein the subtraction is effected by reversing the polarity of recording one of the received signals and then adding the records of such received signals.

3. Method according to claim 1 wherein the cycle of the first five steps enumerated in claim 1 is repeated for a plurality of cycles and the sum of alternate ones of all said received records is subtracted from the sum of the others of said received records to produce said composite record.

4. Method according to claim 1 wherein the location of the transducer is changed after each cycle.

5. Method according to claim 1 wherein each said signal is a down sweep.

6. Method according to claim 5 wherein an odd number of sweeps, at least nine in number, is performed.

7. In the method of seismic exploration employing excitation means for generating an electric sweep signal, vibrator means responsive to the excitation means to generate and transmit to the earth a seismic sweep signal generally similar to said electric signal, seismometer means for receiving the seismic signal, e.g., when reflected or refracted from a sub-surface formation, and recording means for recording the output of the seismometer, wherein a series of sweep signals is generated by said excitation means, and the resultant series of seismic signals is recorded by said recording means and the series of recorded signals is composited prior to cross-correlation with the excitation signals, the improvement comprising reversing the polarity of excitation and recording on every other sweep, while maintaining constant the range of amplitude of each sweep compared to the other sweeps, and preferably but not necessarily performing an even number of sweeps.

8. Method of siesmic exploration comprising:
generating a signal of frequency changing with time,
supplying said signal to a transducer whose mechanical output is positioned to transmit a mechanical vibratory signal to the earth in response to receipt of said signal by said transducer,
receiving said mechanical vibratory signal transmitted through the earth,
recording the received mechanical vibratory signal,
repeating the foregoing steps once with reversed polarity of said generated signal, and reversed polarity of recording, repeating the cycle of the first five steps enumerated above for a plurality of cycles, producing a composite record by adding all of the records of said received signals, and cross-correlating said composite record.

9. Method of seismic exploration comprising the steps of
   1. transmission into the earth of a mechanical vibratory signal of a frequency changing with time,
   2. repetition of the transmission of step (1) a number of times using a signal of reversed polarity during some of said repetitions,
   3. recording receptions of said transmissions,
   4. compositing the recordings in such a manner as to produce a composite equal to the sum of all the recordings of the receptions of said transmissions using reversed polarity signals subtracted from the sum of the recordings of the reception of the remainder of said transmissions, and
   5. cross-correlating said composite of said recordings with said signal transmitted into the earth.

10. Method according to claim 9 wherein the transmissions using a signal of reversed polarity alternate with the other transmissions.

11. Method according to claim 9 wherein are composited recordings of transmissions using a signal of reversed polarity as nearly as possible equal in number to recordings of other transmissions.

12. Method according to claim 11 using an even number of recordings of said transmissions.

13. Method according to claim 10 using an even number of transmissions.

* * * * *